Figure 4:
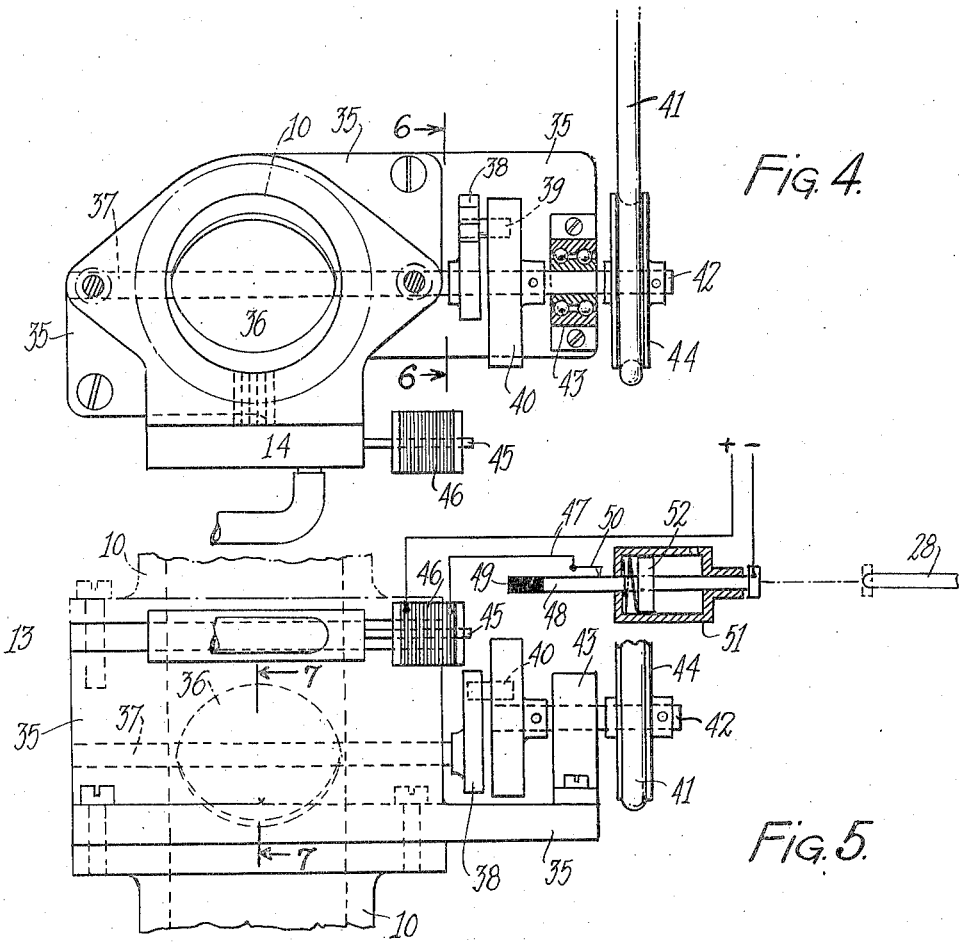

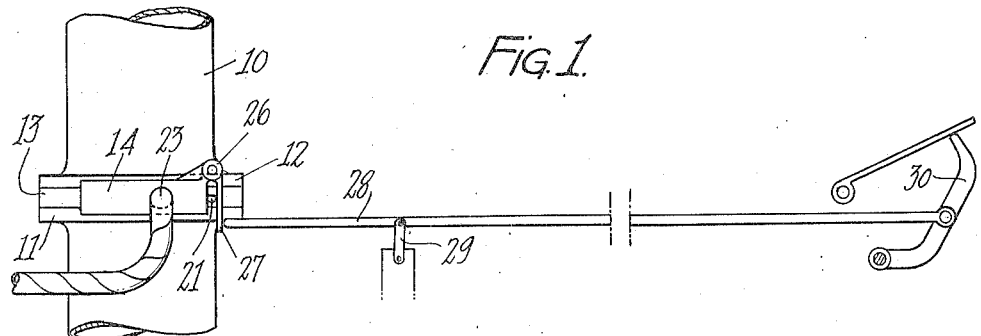
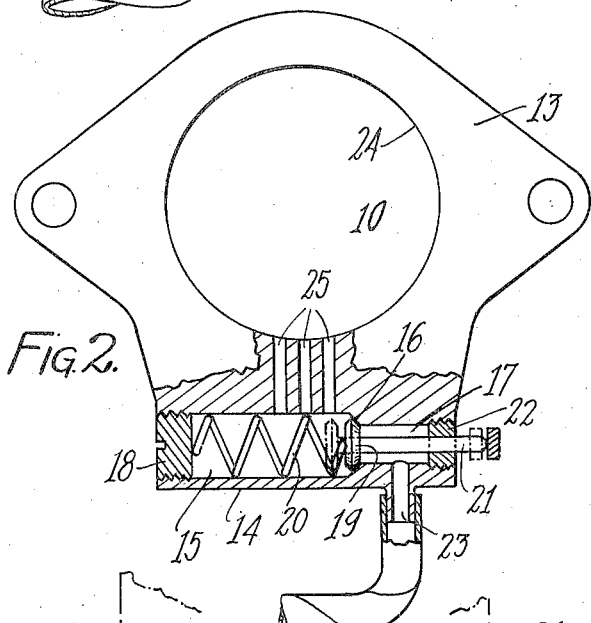
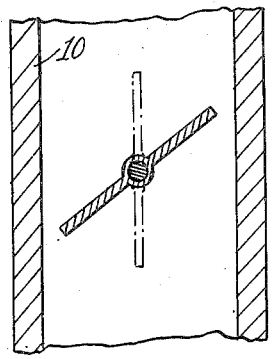
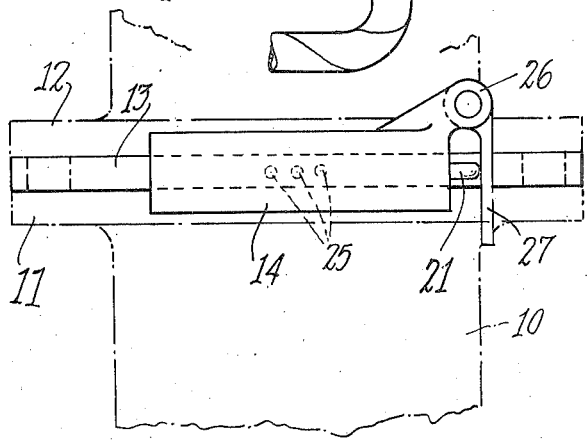

May 16, 1939.  F. GIANATASIO  2,158,819

AUXILIARY AIR CONTROL VALVE

Filed Nov. 3, 1937  2 Sheets-Sheet 2

INVENTOR.

Frank Gianatasio

Patented May 16, 1939

2,158,819

UNITED STATES PATENT OFFICE 2,158,819

AUXILIARY AIR CONTROL VALVE

Frank Gianatasio, New York, N. Y.

Application November 3, 1937, Serial No. 172,531

5 Claims. (Cl. 123—119)

This invention relates to fuel mixing devices as principally employed in automotive vehicles and in which it is desirable to thoroughly mix the atomized fuel and air as it passes through the intake pipe of the engine and also control air admission to the intake pipe in addition to air that is already a part of the explosive mixture.

A principal object of my invention is to provide a means whereby the rich mixture of fuel and air that is admitted to the intake pipe and engine, may be diluted or weakened so that fumes resulting from partially burned gasoline are cut down or reduced so that they are not as objectionable as at present in vehicles where no means are employed to control the mixture before or after acceleration. In the acceleration of the engine, the rich mixture is not always burned completely because in deceleration which must follow, the air is cut off by the throttle and the unburned gasoline remains as a heavy vapor in the engine with the result that smoking occurs and noxious fumes are ejected and get into the body of the car.

In my invention, I contemplate the use of an air valve that operates in addition to the usual air valve employed in the carburetion of the fuel, this valve being so located with respect to the intake pipe that it maintains a combustion balance between the fuel and air so that complete burning of the fuel mixture is provided and fuming is avoided even after the accelerator pedal is released to bring about deceleration of the vehicle. In connection with the auxiliary air control valve, I employ adjacent thereto a fuel agitating device of the type set forth in my pending application Serial No. 104,020 filed October 5, 1937, which I have found gives a more complete admixture of fuel and air as the air is delivered at the point in the intake pipe where the violent agitation of the mixture occurs. In this respect the air supply means, that is controlled by the movement of the accelerator pedal, that I employ to supply the additional air found necessary, cooperates with the fuel agitator to give a thorough mixture of the fuel and air that comes into the intake pipe for combustion after the accelerator pedal is released. This additional supply of air, uncontrolled from the carburetor air intake supplies the additional amount of air necessary to afford complete combustion after the air supply to the carburetor has been throttled by operation of the accelerator pedal in deceleration.

A still further object of my invention is to provide a mechanical control for operating the auxiliary air valve so that the air is not cut off, but enters the pipe until the accelerator foot pedal is again depressed. Other objects of the invention includes the use of electrical and air control means for affecting operation of the valve at the proper time and for the proper length of time. Also, my invention contemplates the manufacture of an auxiliary air valve that can be incorporated in the intake pipe of any existing engine construction, with or without the fuel agitating means and which will eliminate to a large extent the odorous gas condition present in vehicles that is due largely to the cutting off of the air supply so that complete combustion is not supported after the accelerator pedal is released in deceleration.

Figure 5:
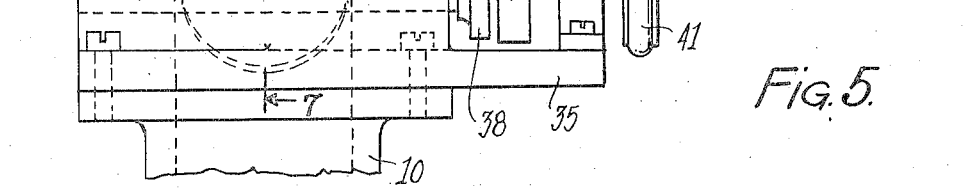
Figure 6:
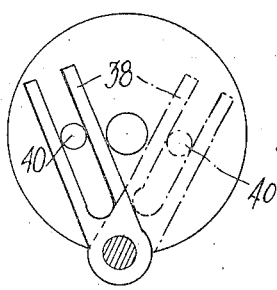

Changes and variations may be made in the construction shown and described without departing from the principles of the invention or sacrificing its chief advantages; hence such invention is not to be confined to the precise structures shown in the accompanying drawings, in which:

Figure 1 is a view in side elevation of a part of an engine intake pipe in which is incorporated my improved auxiliary air control valve and the operating connections of the same to the accelerator pedal being also illustrated, Figure 2 is an enlarged section on the line 2—2 of Figure 1, showing the internal construction of the air valve and the means of uniting it with the intake pipe of an internal combustion engine, Figure 3 is a view in side elevation of the valve illustrated in Figure 2, Figure 4 is a plan view of a fuel agitating device in combination with which is employed my improved valve, the means of connecting both the agitator and valve in a fuel intake pipe being shown, Figure 5 is a side view of the agitator and valve illustrated in Figure 4, the modified means of operating the valve being illustrated herein, Figure 6 is a section on the line 6—6 of Figure 4 showing the means for operating the butterfly valve of the agitator at high speed in order to thoroughly churn the fuel mixture, and Figure 7 is a section taken through the fuel intake pipe showing the operation only of the churning valve and its oscillating positions.

Referring to the drawings in detail 10 indicates a fuel intake pipe of an internal combustion engine of any well known type which leads the mixture of gasoline and air, after it leaves the carburetor, to the intake manifold. This pipe 10 is provided with flanges 11 and 12 between which is interposed the flange 13 forming a part of the pipe and passage for the fuel and constituting a passage forming section to one side of which is integrally cast, the valve housing 14. This housing is bored longitudinally to provide a valve chamber 15 terminating in a valve seat 16 which opens into an air passage 17. The chamber 15 also constitutes an air passage as will be hereinafter pointed out, and it is closed at one end by the plug 18 which imprisons a coil spring that keeps a valve 19 in place on said valve seat 16. The spring 20 is sufficiently yieldable to permit the valve 19 to be opened by operation of the valve stem 21 formed as part of said valve and extending through the air passage 17 and slidably supported in the closure plug 22 sealing the end of air passage 17.

The housing 14 is provided with a side opening constituting an inlet for air as at 23, and to which a flexible air hose can be attached that will supply air from any suitable source to the air passage 17 from whence it can enter the valve chamber 15 when the valve 19 is opened to enter the pipe 10 through a plurality of air flues connecting said valve chamber 15 with the passage opening 24 in the flange 13. These flues, indicated by the numeral 25 are cast in the flange and housing or otherwise formed therein and permit the flange to be made of a minimum thickness consistent with compact construction.

In the form of the invention illustrated in Figures 1, 2 and 3 it is evident that the construction illustrated can be employed with the agitator shown in Figures 4, 5, and 6. The housing 14 is provided with the ear 26 to which is pivoted the depending arm 27 which overlies the end of the valve stem 21 that protrudes from the housing 14. The lower end of arm 27 is in the path of a longitudinally operated bar 28 pivoted as at 29 to a support member and at its end pivoted to the accelerator foot pedal 30.

In the operation of the device, as is well known, the accelerator pedal 30 is ordinarily depressed to feed more fuel to the engine. As the accelerator is released, this fuel feed is cut down and the air is accordingly throttled so that combustion decreases. This results in much of the fuel particles entering the intake pipe without being mixed with the air, of which there is a deficiency. The result is that combustion is incomplete and the unexploded vapor fuel is burned, giving off a noxious odor. In my device, as the foot is removed from the accelerator pedal, the latter swings up and causes movement of the bar 28 which, engaging the arm 27, moves the valve stem to unseat the valve 19 with the result that additional air enters through air passage 17, chamber 15, and flues 25 to the intake pipe 10 to balance the fuel that has come in to the intake pipe after the air has been cut off by deceleration. It is particularly desirable to supply additional air to the intake pipe at this point so that complete combustion of the fuel will take place and so that if any burning of the unatomized fuel does take place it will not give off the heavy disagreeable odor that prevails in instances where burning takes place with the rich fuel fed into the engine immediately after deceleration.

In the form of invention in Figures 4 to 7 inclusive, the pipe 10 includes also, in addition to the flange 13 of the auxiliary air valve, the flange 35 or ball bearing block providing a passage in which is disposed an oscillatable butterfly valve 36, mounted on the shaft 37 which extends exteriorly of the block 35 and carries the yoke 38 which is rapidly oscillated by a pin 39 extending from the face of a flywheel 40. The pin is arranged off center so that, in its revolving operation it imparts a swing to the yoke to rapidly vibrate the valve 36 which in turn breaks up the particles of vapor and more thoroughly commingles them to provide more complete fuel combustion. In order to operate the flywheel, power is taken from any suitable source by a drive belt 41 which operates a drive shaft 42 mounted in a suitable bearing 43 and carrying the pulley 44 and flywheel 40.

The block 35 together with the air valve flange 13 may be interposed between the flanges 11 and 12 of pipe 10 so that the air flues will supply air at a point adjacent the oscillating disk 36 to afford very thorough mixture of the fuel and air to make the mixture more combustible. In this form of the auxiliary air valve, the parts are substantially the same as illustrated in Figures 2 and 3 except that the ears 26 are omitted and the valve stem 21 is extended as at 45 to form the core of a solenoid coil 46 in a circuit 47. The circuit also includes a movable square shaft of metal 48 whose end is insulated as at 49, a contact 50 from the solenoid engaging said shaft. The shaft passes through a cylinder 51 or dashpot in which is movably mounted a slow acting piston 52 which expels air from the cylinder as it moves under the influence of a spring. The end of the longitudinally operating bar 28 is arranged to contact the end of shaft 48 and move the shaft to the position shown in Figure 5 to complete the circuit and cause the solenoid to actuate the air valve 19 to admit air to the pipe 10 as before. The slow leak of air from cylinder 51 keeps the valve 19 open long enough to supply sufficient air to the pipe 10 to support more perfect combustion as previously referred to. The device does not interfere with the free operation of the accelerator pedal at any time.

My invention contemplates the periodic injection of air which in thinning the richer fuel mixture causes more complete combustion thereof and this results in the clearing of the manifold and exhaust of heavy noxious gases that find their way into the interior of a vehicle with disagreeable results. By the use of the novel auxiliary air valve I have found that a saving of fuel is possible. Also the valve can be made a part of the carburetor or used in any relation to the engine as desired.

My invention is not to be restricted to the precise details of construction shown since various changes and modifications may be made therein without departing from the spirit of the invention or the scope of the appended claim.

What I claim is:

1. In a charge forming device for internal combustion engines, in combination, a fuel mixture intake pipe, a passage forming section in the pipe forming a part of said pipe, a valve housing formed integral with said section and bored to provide a valve chamber and an air passage in longitudinal alignment, air flues in said section extending laterally from the passage in said section to said valve chamber, a valve in the valve chamber having a valve stem extending through said air passage and exteriorly of said housing, a spring in the valve chamber yieldably resisting movement of the valve off its seat to allow passage of air from said air chamber into the valve chamber, an air inlet to said air passage, an arm pivoted to said housing and in engagement with said valve stem, and said arm being operated by an accelerator foot pedal controlled member to open the valve.

2. In a charge forming device for internal combustion engines, in combination, a fuel mixture intake pipe, a passage forming section in the pipe forming a part of said pipe, a valve housing formed integral with said section, and bored to provide a valve chamber and an air passage in longitudinal alignment, air flues in said section extending laterally from the passage in said section to said valve chamber, a valve in the valve chamber having a valve stem extending through said air passage and exteriorly of said housing, a spring in the valve chamber yieldably resisting movement of the valve off its seat to allow passage of air from said air chamber into the valve chamber, an air inlet to said air passage, an ear on the housing, an arm pivotally depending from said ear and overlying the end of said valve stem and, the arm arranged to be operated by an accelerator foot pedal controlled member to open the said valve.

3. In a charge forming device for internal combustion engines, in combination, a fuel mixture intake pipe, a passage forming section in the pipe forming a part of said pipe, a valve housing formed integrally with said section and bored to provide a valve chamber and air passage in longitudinal alignment, air flues in said section extending laterally from the passage in said section to said valve chamber, a valve in the valve chamber having a valve stem extending through said air passage and exteriorly of said housing, a spring in the valve chamber yieldably resisting movement of the valve off its seat to allow passage of air from said air chamber into the valve chamber, an air inlet to said air passage, and actuating means for moving said valve stem controlled by the movement of an accelerator foot pedal member.

4. In a charge forming device for internal combustion engines, in combination, a fuel mixture intake pipe, a passage forming section in the pipe forming a part of said pipe, a valve housing formed integral with said section and bored to provide a valve chamber and an air passage in longitudinal alignment, air flues in said section extending laterally from the passage in said section to said valve chamber, a valve in the valve chamber having a valve stem extending through said air passage and exteriorly of said housing, a spring in the valve chamber yieldably resisting movement of the valve off its seat to allow passage of air from said air chamber into the valve chamber, an air inlet to said air passage, a solenoid, the core of which constitutes an end of said valve stem, a circuit member for keeping the solenoid energized for a time interval, and actuation of said circuit member being controlled by the movement of an accelerator foot pedal member.

5. In a charge forming device for internal combustion engines as set forth in claim 3, a butterfly valve in the pipe adjacent said passage forming section and means for rapidly vibrating said butterfly valve whereby the air coming into the pipe through said flues in thoroughly commingled with the fuel mixture passing through said pipe.

FRANK GIANATASIO.